United States Patent [19]

Apezynski

[11] 4,344,654

[45] Aug. 17, 1982

[54] WHEEL TRIM RETENTION

[76] Inventor: Frederick A. Apezynski, 15602 Parklane, Livonia, Mich. 48154

[21] Appl. No.: 241,257

[22] Filed: Mar. 6, 1981

Related U.S. Application Data

[63] Continuation of Ser. No. 7,019, Jan. 29, 1979, abandoned, which is a continuation of Ser. No. 792,253, Apr. 29, 1977, abandoned.

[51] Int. Cl.³ .............................................. B60B 7/00
[52] U.S. Cl. ................................ 301/37 R; 301/37 P; 301/108 R; 24/204; 29/159 A
[58] Field of Search ............. 301/37 R, 37 P, 37 CM, 301/37 TP, 37 B, 37 H, 37 L, 37 T, 108 A, 108 R, 108 TW; 24/289, 297, 204; 29/159 A; 40/587

[56] References Cited

U.S. PATENT DOCUMENTS

| | | | |
|---|---|---|---|
| 2,754,940 | 7/1956 | Lyon | 301/37 TP |
| 3,000,384 | 9/1961 | Piers, Jr. | |
| 3,143,895 | 8/1964 | Robie | 24/204 |
| 3,147,528 | 9/1964 | Erb | 24/204 |
| 3,260,294 | 7/1966 | Campion | 24/204 |
| 3,481,652 | 12/1969 | Mazerolle | |
| 3,548,185 | 12/1970 | Hall | 301/37 P |
| 3,669,501 | 6/1972 | Derleth | |
| 3,724,905 | 4/1973 | Kackler | 301/37 P |
| 3,726,566 | 4/1973 | Beith | 301/37 R |
| 3,829,938 | 8/1974 | Ballin | 24/204 |
| 3,883,180 | 5/1975 | Kain | |
| 3,915,502 | 10/1975 | Connell | 301/37 R |
| 4,054,323 | 10/1977 | Lewis | |

FOREIGN PATENT DOCUMENTS 1438070  6/1976  United Kingdom .

Primary Examiner—H. Grant Skaggs
Attorney, Agent, or Firm—Harness, Dickey & Pierce

[57] ABSTRACT

There is disclosed herein a wheel trim retention system comprising interengaging portions secured to opposing generally radially extending flange portions of the wheel trim and vehicle wheel which cooperate with each other to form a secure retention arrangement. In one form, the interengaging portions comprise a plurality of circumferentially spaced portions secured to corresponding flange portions of the wheel trim and vehicle wheel with a valve stem opening in the trim member serving to circumferentially position the trim member with respect to the wheel. Radial locating protrusions may also be provided on the trim which cooperate with flange portions of the vehicle wheel to axially align the mating portions as the wheel trim is installed thereon.

19 Claims, 8 Drawing Figures

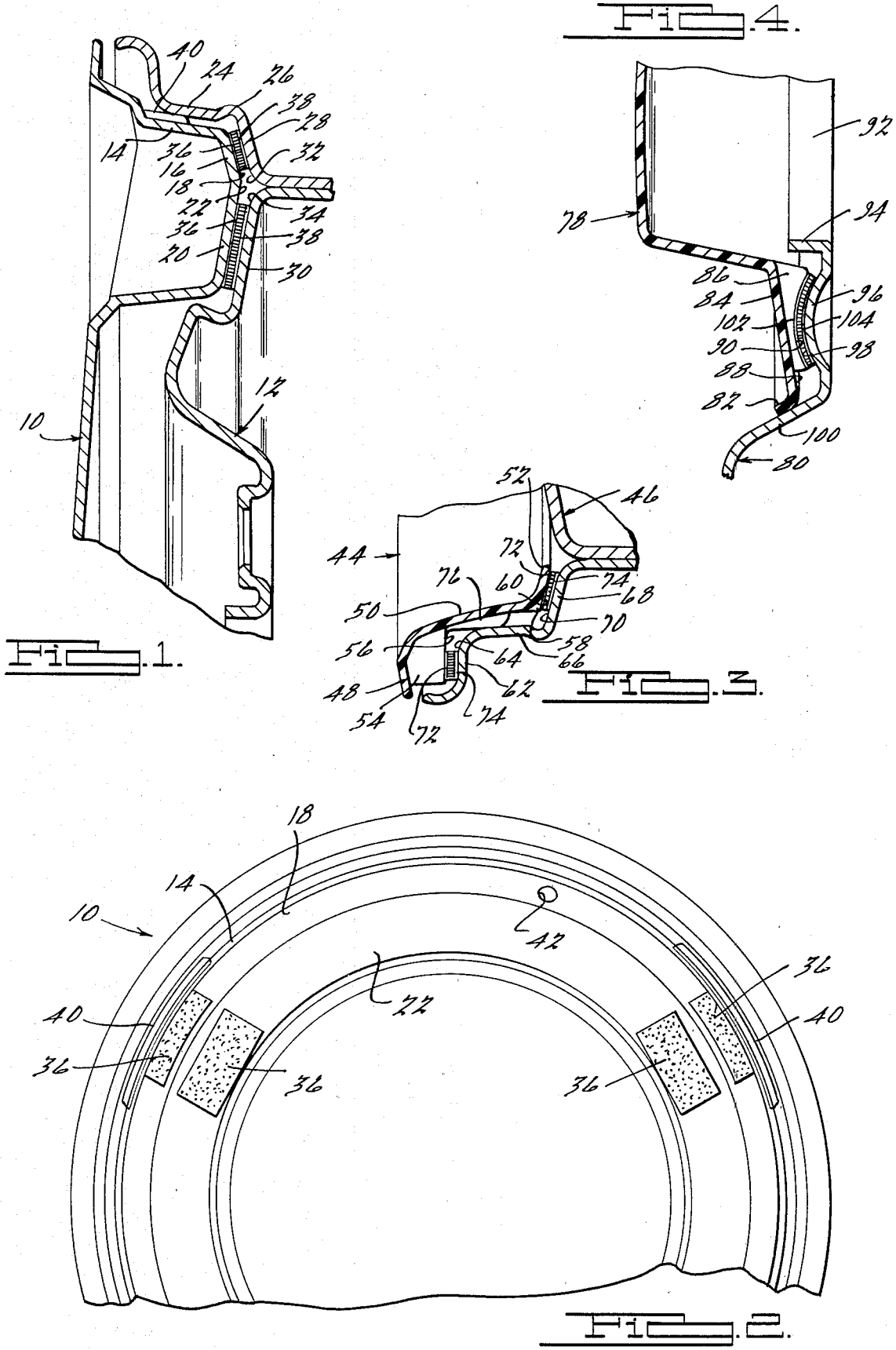

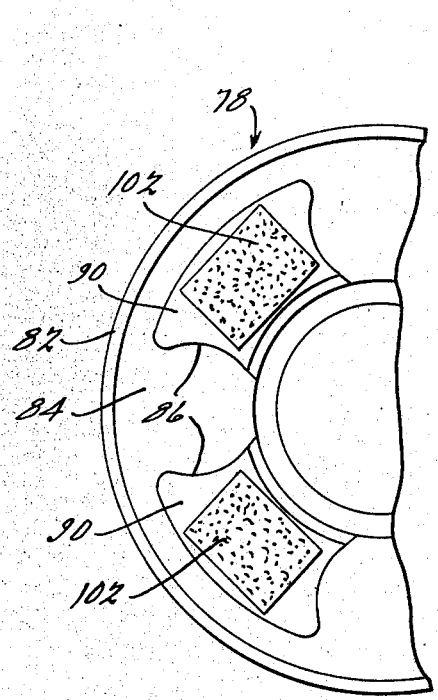
FIG. 5.
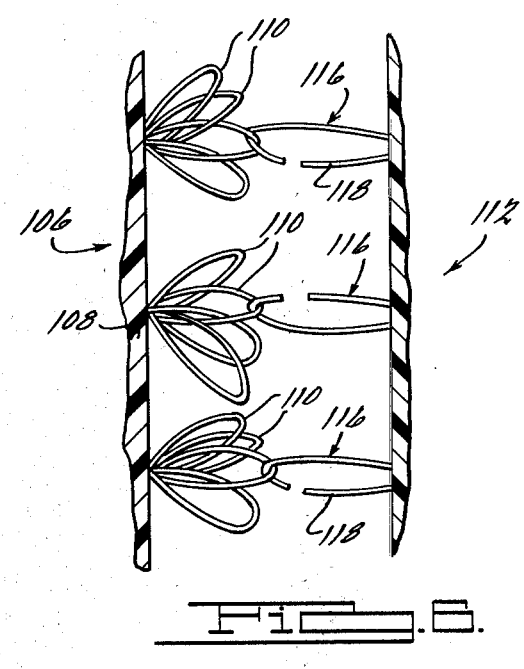
FIG. 6.
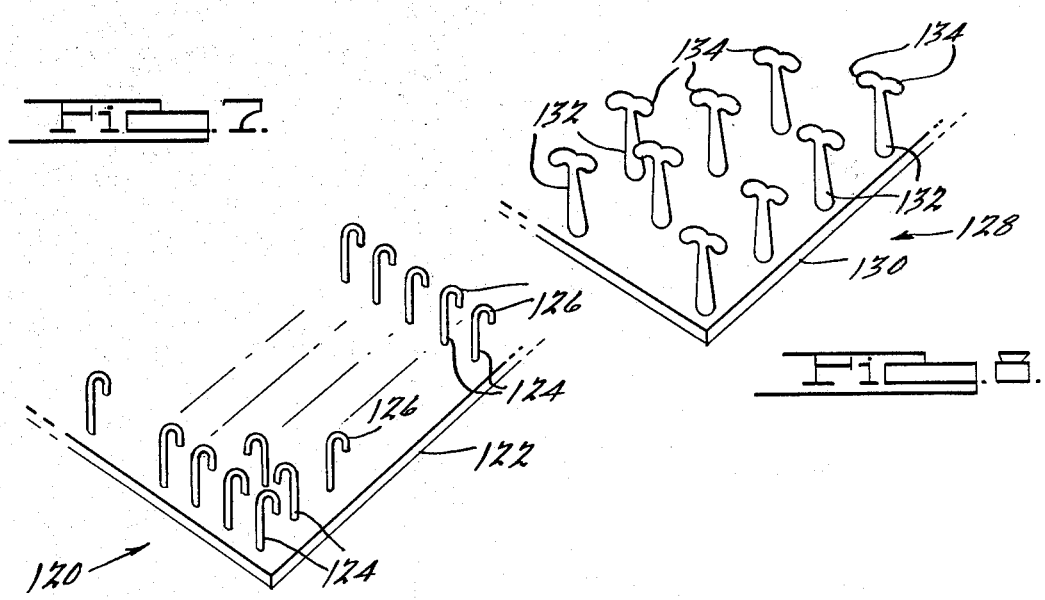
FIG. 7.
FIG. 8.

WHEEL TRIM RETENTION

This is a continuation of application Ser. No. 7,019, filed Jan. 29, 1979, which which is a continuation of application Ser. No. 792,253, filed Apr. 29, 1977, both now abandoned.

BACKGROUND AND SUMMARY OF THE INVENTION

The present invention relates generally to retention means for securing wheel trim to vehicle wheels and more particularly to such retention means which include cooperating elements on both the trim member and vehicle wheel.

Wheel trim in various forms have long been provided on vehicles serving to decorate the vehicle wheel. One of the major problems associated with such wheel trim is to provide reliable and inexpensive retention means for removably securing the trim to the wheel. Compounding this problem is the necessity for allowing the wheel trim to be easily removed and reinstalled, prevention of annoying rattle or relative rotation of the trim and wheel and the desire to allow maximum flexibility for designs which provide a pleasing decorative appearance when installed on the vehicle.

Numerous retention arrangements have been derived over the years ranging from the use of variously shaped clips riveted to the vehicle wheel to use of biting clip members secured to the trim member. While each of these arrangements provide varying degrees of effectiveness in retaining wheel trims, they commonly employed clips engaging each of the members which are generally fabricated from a steel material. Recently, in order to improve ride performance of vehicles as well as to reduce overall weight of the vehicle, alloy wheels have been developed to replace the present steel wheels. Wheel trim securing clips of steel are not suitable for use with such alloy wheels due primarily to the presence of galvanic corrosion due to the dissimilar metals. Accordingly, it is necessary to develop alternate retention means for these wheels.

Also, the desirability of using plastic materials for fabricating wheel trim presents a retention problem not easily overcome by presently available retention systems as plastic materials are not well suited for use under conditions in which stress is exerted thereon, particularly under the extreme temperature and vibration conditions encountered by wheel trim. Thus, as most presently available retention means depend on the creation of a spring pressure between the wheel and trim, it is difficult to design durable wheel trim from plastic materials which will perform satisfactorily over an extended period of time.

Accordingly, the present invention provides a unique wheel trim retention means which overcomes these above mentioned disadvantages by providing a retention system comprising cooperating hook and loop fastener members secured to corresponding radially extending axially aligned oppositely facing surfaces of the wheel trim and vehicle wheel which provide an extremely strong, durable, resilient connection between the vehicle wheel and wheel trim. As these hook and loop fastener members are typically fabricated from synthetic fiber materials, they are not subject to corrosion such as from road salt. Further, as they are not electrically conductive, they are well suited for use with the newly developed alloy wheels as they not only eliminate the galvanic corrosion which may result with the use of presently available metal retention means but further may be positioned so as to maintain an insulating spacing between the trim member and vehicle wheel thus allowing continued use of such metal materials as stainless steel for fabrication of wheel trim without concern over galvanic corrosion problems. Also, as the retention forces generated by these hook and loop fasteners are of a statically unstressed non-rigid nature, these fasteners are ideally suited for use with wheel trim fabricated from plastic compositions. Another important phenomena displayed by these hook and loop fasteners is that when subjected to vibrations, the mutual engagement thereof tends to become stronger. Further, in that these hook and loop fasteners require only that relatively small generally axially facing opposed and alignable surfaces be provided on the wheel and wheel trim, substantially infinite freedom is affordable for design of aesthetically pleasing distinctive wheel trim. Also, these hook and loop fasteners are readily applied to both wheel trim and wheels without the need for any special tools, are not subject to breakage, extremely resistant to deterioration, do not become work hardened with repeated removal and replacement of the wheel trim and provide a resilient strong shock absorbing retention system, and are highly resistant to breaking or other degradation with use as well as being easily replaceable should a failure be encountered. Hook and loop fasteners for use in accordance with the present invention are disclosed in the following U.S. Pat. Nos.: 2,717,437; 3,009,235; 3,076,244; 3,130,111; 3,147,528; 3,154,837; 3,192,589; and 3,387,345.

Additional advantages and features of the present invention will become apparent from the following detailed description of the preferred embodiments taken in conjunction with the drawings and claims appended hereto.

BRIEF DESCRIPTION OF THE DRAWINGS

FIG. 1 is a view of a portion of a wheel trim in the form of a wheel cover shown in relationship to a portion of a conventional vehicle wheel both of which are sectioned along a radial plane lying parallel to and passing through the rotational axis thereof;

FIG. 2 is a view of a portion of a wheel trim employing retention means in accordance with the present invention as viewed looking outwardly from the vehicle wheel along the rotational axis thereof;

FIG. 3 is a view similar to that of FIG. 1 but showing another embodiment of the present invention;

FIG. 4 is also a view similar to that of FIG. 1 showing another embodiment of the present invention;

FIG. 5 is a view similar to that of FIG. 2 but illustrating the embodiment of FIG. 4;

FIG. 6 is an enlarged perspective view of one form of a hook and loop fastener for use in accordance with the present invention;

FIG. 7 is an enlarged perspective view of another embodiment of the hook portion of the hook and loop fastener employed in the present invention; and FIG. 8 is an enlarged view similar to that of FIG. 7 but illustrating yet another embodiment of the hook fastener portion employed in the present invention.

DESCRIPTION OF THE PREFERRED EMBODIMENTS

Referring now to FIG. 1, there is shown a portion of a wheel trim 10 in installed relationship to a portion of a conventional multiflanged vehicle wheel 12. As illustrated, wheel trim 10 is in the form of a wheel cover of metal construction and includes a generally axially inwardly extending flange portion 14, the axially inner edge of which merges with a generally radially and slightly axially inwardly extending flange portion 16 having a generally axially inwardly facing surface 18. The radially inner edge of flange portion 16 in turn merges with an adjacent generally radially inwardly and slightly axially outwardly extending flange portion 20 also having a generally axially inwardly facing surface 22.

Vehicle wheel 12 is of conventional construction including a generally axially inwardly extending flange portion 24 adjacent the radially outer edge thereof having a safety groove 26 provided thereon at the axially inner edge. Additional flange portions 28 and 30 extend generally radially inwardly from safety groove 26 and include axially outwardly facing surfaces 32 and 34 which are substantially parallel to respective surfaces 18 and 22 of flange portions 16 and 20 of wheel trim 10.

In order to removably secure wheel trim 10 to vehicle wheel 12, a pair of first hook and loop fastener members 36 of a generally rectangular shape are secured to surfaces 18 and 22 of wheel trim 10 as best seen with reference to FIG. 2 and similarly a pair of second hook and loop fastener members 38 of substantially the same size and shape as members 36 are secured to surfaces 32 and 34 of wheel 12 as shown in FIG. 1. Each of the corresponding first and second hook and loop fastener members 36 and 38 are positioned so as to allow them to mutually engage each other along substantially their entire surface thereby forming a secure means for retaining the wheel trim in position upon the vehicle wheel. It should be noted that while hook and loop fastener members 36 and 38 have been illustrated and described herein as being generally rectangular in shape, they may easily be of any desired shape suitable for the particular application. Further, if desired either of fastener member 36 and 38 may be slightly longer than the other or even extend around the entire circumference of either the wheel or trim member.

In order to insure wheel trim 10 is accurately radially positioned on wheel 12, an axially and circumferentially elongated radially outwardly projecting locating protrusion 40 is provided along flange portion 14 of wheel trim 10. Locating protrusion 40 will preferably be sufficiently axially elongated so as to engage axial flange portion 24 of wheel 12 prior to the mutual engagement of first and second hook and loop fastener members 36 and 38 thereby radially positioning wheel trim 10 with respect to wheel 12 so as to aid in axially aligning and insuring full surface engagement of first and second hook and loop fastener members 36 and 38. As illustrated in FIG. 2, wheel trim 10 is also provided with a relatively small diameter opening 42 in flange portion 16 thereof which is adapted to accommodate a tire valve and which also serves to rotationally position wheel trim 10 with respect to vehicle wheel 12. Thus, protrusion 40 and opening 42 cooperate to insure accurate axial and radial alignment of each of the mating first and second hook and loop fastener members.

Generally wheel trim 10 will be provided with a plurality of locating protrusions spaced around the circumference thereof as is shown in FIG. 2. While the specific number is not critical however, it is believed a minimum of three such protrusions will be necessary in order to accurately radially locate wheel trim 10. Also, it should be noted that should it be desirable, protrusions 40 may be in the form of a continuous annular shoulder or even formed on the wheel itself should this be desirable. Further, as also shown in FIG. 2, wheel trim 10 will generally be provided with a plurality of first hook and loop fastener members spaced around the circumference thereof with corresponding second hook and loop fastener members appropriately positioned on vehicle wheel 12, the specific number and total mutually engaging surface area thereof being determined by the weight of the wheel trim to be retained as well as the positioning and available axially opposed surface areas. It should also be noted that the corresponding hook and loop fastener members may be positioned in axially aligned relationship on any generally radially extending surfaces of the wheel and wheel trim members; however, it will generally be desirable to position them adjacent or near the circumferential edge of wheel trim 10 in order to insure the edge portion is retained in close proximity to the vehicle wheel. Thus, wheel trim 10 may be fabricated with any decorative contour desired as the hook and loop fastener members require only that the trim member have some axially inwardly facing surfaces which can be axially aligned with corresponding axially outwardly facing surfaces on the wheel. Further, as these hook and loop fastener members do not depend upon any critical spacing between radially inwardly and outwardly facing surfaces to generate their retention forces, they allow greater tolerances in manufacturing of the wheel trim thus reducing the costs associated therewith. Also, in that the retention force generated by these hook and loop fastener members do not exert a compressive force on the wheel trim member they are ideally suited for use with wheel trim fabricated from plastic compositions.

While the wheel trim of FIG. 1 is illustrated as being in the form of a wheel cover, the present retention means may be easily applied to secure a wheel trim in the form of a trim ring 44 to a conventional vehicle wheel 46 as is illustrated in FIG. 3. Trim ring 44 includes a generally radially inwardly extending flange portion 48 at its radially outer edge which extends radially inwardly and merges smoothly with a generally axially and radially inwardly extending flange portion 50. The axially inner end of flange portion 50 in turn merges smoothly with a second generally radially inwardly extending flange portion 52. An axially inwardly projecting shoulder portion 54 is formed on the axially inner surface of trim ring 44 and includes a surface 56 lying in a generally radial plane. Similarly, a second axially inwardly projecting shoulder 58 is formed on flange portion 52 and also includes a generally axially inwardly facing surface 60.

Wheel 46 is substantially identical to wheel 12 and includes a generally radially extending flange portion 62 adjacent the radial outer edge thereof and having an axially outwardly facing surface 64. The radially inner edge of flange portion 62 merges into a generally axially inwardly extending flange portion 66 which in turn merges with a second generally radially inwardly extending flange portion 68 having a generally axially outwardly facing surface 70 extending substantially parallel to surface 60 of wheel trim 44.

Similarly to that described with reference to FIG. 1, a first hook and loop fastener member 72 is secured to each of the axially inwardly facing surfaces 56 and 60 of trim ring 44 and is adapted to engage a second hook and loop fastener member 74 secured to corresponding surfaces 64 and 70 of wheel 46 so as to securely retain trim ring 44 in position thereon. Trim ring 44 is also provided with an axially and circumferentially elongated radially outwardly extending protrusion 76 similar to protrusion 40 of wheel trim 10 which cooperates with axially inwardly extending flange portion 66 of wheel 46 to radially position trim ring 44 as it is installed in like manner as described above. Trim ring 44 may also be provided with a tire valve opening similar to opening 42 for rotationally positioning it with respect to wheel 46.

The retention means of the present invention may also be easily employed to retain a hub cap in position upon a vehicle wheel. Such an embodiment is illustrated and will be described with reference to FIG. 4. As shown, a wheel trim 78 in the form of a hub cap is illustrated in installed relationship to a vehicle wheel 80 and is adapted to cover only the central hub portion thereof. In this embodiment, wheel trim member 78 is fabricated from a suitable plastic material and is provided with a generally axially outwardly and radially inwardly projecting flange portion 82 at its outer circumferential edge and a generally radially inwardly and slightly axially outwardly extending flange portion 84. Generally radially inwardly and axially outwardly extending flange portion 84 is provided with a radially elongated generally axially inwardly extending protrusion 86 on its lower surface 88 which has a generally concave axially inwardly facing surface 90. A plurality of protrusions substantially identical to protrusion 86 are spaced around the circumference of wheel trim 78 as illustrated in FIG. 5 including axially inwardly facing concave surfaces.

Vehicle wheel 80 has a relatively large diameter central opening 92 defined by generally axially outwardly extending annular flange portion 94 with a generally convex annular flange portion 96 projecting generally radially outwardly from the axially inner edge thereof. Flange portion 96 is radially aligned with protrusion 86 and has an axially outwardly facing surface 98 having a shape complementary to that of surface 90 of protrusion 86. Vehicle wheel 80 is also provided with a generally axially and radially outwardly extending flange portion 100 adjacent the radially outwardly disposed edge of convex flange portion 96 which is adapted to be engaged by the radially and axially inwardly extending flange portion 82 of wheel trim member 78 so as to center wheel trim member 72 as it is installed upon vehicle wheel 80. Surface 90 of each protrusion 86 and the convex surface 98 of flange portion 96 are each provided with mating hook and loop fastener members 102 and 104 respectively secured thereto which are adapted to mutually engage each other so as to retain wheel trim member 78 in position upon the vehicle wheel 80 in substantially the same manner as described above. Also, as previously mentioned, the specific size and number of hook and loop fasteners necessary to retain wheel trim member 78 will be determined by various factors including the weight of the wheel trim to be retained.

First and second hook and loop fastener members are illustrated and will be described in detail with reference to FIGS. 6 through 8. As shown in FIG. 6, in one form the hook and loop fastener is comprised of a first portion 106 having a base member 108 upon which a plurality of disoriented loops 110 are formed extending generally outwardly therefrom. Preferably, these loops will be formed of a synthetic monofilament type material such as nylon for example which may be interwoven within the base member and will be arranged so as to project randomly in various directions outwardly therefrom. While loops 110 as shown in FIG. 6 appear to be widely spaced on base member 108, they will actually be disposed closely adjacent each other so as to form a generally continuous plush velvet like surface made up of a large number of disoriented loops. The second portion 112 of the hook and loop fastener also comprises a base member 114 from which individual loops 116 project outwardly. Loops 116 may be similarly formed as described with reference to loops 110 of base member 108 but in this instance each of the loops is cut along one leg thereof so as to form a hook-like member. Each of these hook members is subjected to a thermal setting process so as to retain their generally hook or J-shaped configuration thus allowing them to hook onto loops 110 provided on base member 108 when portions 106 and 112 are brought into mutual engagement. While the engagement of each hook member 116 with loops 110 is capable of exerting only a relatively small retention force due to the flexible nature of the hook members, concentrations of up to 400 hooks per square inch may be provided on base member 114 which together are capable of exerting a substantial total retention force particularly with regard to the generally radially and axially directed forces normally encountered by wheel trim members.

Referring now to FIG. 7, there is shown another embodiment of a hook containing member of a hook and loop fastener indicated generally at 120 including a base member 122 of a plastic composition material which is provided with a plurality of integrally formed upwardly projecting members 124 having hooked ends 126 provided thereon. As shown, members 124 will preferably be arranged in rows with adjacent rows having the hooked ends 126 facing in opposite directions. In this embodiment the flexibility of the hooked ends 126 may be controlled by varying the type of material employed in fabrication thereof as well as the cross sectional area thereof. Thus, a hook and loop fastener may be provided having substantially greater holding power than that of member 112 thereby enabling smaller or fewer segments thereof to be employed in retaining any particular wheel trim.

Another embodiment of a hook containing member is indicated generally at 128 in FIG. 8 and includes a base member 130 having a plurality of upwardly extending projections 132 provided thereon each of which has a pair of oppositely extending hook arms 134 provided on the terminal end portions thereof. Each of hook arms 134 is able to hook onto a loop of a mating fastener member thereby providing increased holding power without increasing the number of projections provided on base member 130.

It should be noted that either loop or hook containing members may be secured to the wheel trim member with the corresponding member being secured to the wheel. Also, as previously mentioned, in order to insure full engagement of the hook and loop fasteners, it is necessary that the respective members be attached to generally radially extending axially opposed surfaces of the wheel trim and wheel. While several different types of hook and loop fasteners have been illustrated and described herein, the present invention should not be viewed as limited to only these types. Numerous other variations of hook and loop fasteners are presently available and others may be developed all of which may perform equally well in this application such as for example hook and loop fastener members having both hooks and loops formed on the same member.

Thus, as is apparent from the foregoing, the present invention provides a unique wheel trim retention system which affords a strong, durable, non-corrosive, resilient means for attaching wheel trim of most any size and shape to a vehicle wheel. It should also be noted that as these hook and loop fasteners are highly resistant to both shear forces as well as tension, they offer the additional advantage of preventing relative rotation between the wheel trim and vehicle wheel. The hook and loop fasteners may be easily secured to both the wheel trim and vehicle wheel by any suitable adhesive. Also, as new vehicles are generally shipped to dealers without the wheel trim installed on the vehicle, the fastener member to be secured to the vehicle wheel may be provided with a suitable pressure sensitive adhesive and protective release paper backing thereby allowing the dealer to secure this member to the vehicle wheel simultaneously with installation of the wheel trim.

While it is apparent that the preferred embodiments of the invention disclosed are well calculated to provide the advantages above stated, it will be appreciated that the invention is susceptible to modification, variation and change without departing from the proper scope or fair meaning of the subjoined claims.

I claim:

1. A wheel trim retention means for removably attaching a wheel trim to a vehicle wheel, comprising:
   means defining a generally axially inwardly facing surface portion on the wheel trim;
   means defining a generally axially outwardly facing surface portion on the vehicle wheel alignable with said axially inwardly facing surface portion of the wheel trim;
   a central portion adapted to overlie and conceal fastening means securing said wheel to a vehicle;
   a separable reuseable hook and loop fastener including a first member comprising a base portion having a plurality of outwardly projecting thread-like disoriented loops per square inch provided thereon, and a second member comprising a base portion having a plurality of outwardly projecting hooks per square inch provided thereon;
   one of said first and second members being permanently secured to said axially inwardly facing surface of said wheel trim and the other of said members being permanently secured to said axially outwardly facing surface of said wheel in a position so as to allow respective of said hooks to releasably engage respective of said loops when said wheel trim is assembled to said vehicle wheel; and
   positioning means provided on said wheel trim including a generally radially outwardly extending protrusion engageable with a generally axially extending surface portion of said wheel to accurately position said wheel trim with respect to said wheel and means for circumferentially positioning said wheel trim relative to said wheel, said protrusions and said circumferential positioning means cooperating to align said first and second members to insure mutual engagement of a maximum number of said hooks and loops thereby enabling said wheel trim to be easily repeatedly removed and reinstalled on said wheel utilizing the same hook and loop fastener.

2. An improved retention means as set forth in claim 1 wherein said hooks are generally J-shaped.

3. An improved retention means as set forth in claim 1 wherein said hooks are generally T-shaped.

4. An improved retention means as set forth in claim 1 wherein said hooks comprise a loop which is slit along one upward extending leg thereof.

5. An improved retention means as set forth in claim 1 wherein said loops are randomly disoriented.

6. An improved retention means as set forth in claim 1 wherein said fastener is fabricated of a material which is not subject to galvanic corrosion.

7. An improved retention means as set forth in claim 1 wherein said hook and loop fastener also prevents relative rotation of said wheel trim and said wheel.

8. An improved retention means as set forth in claim 1 wherein said circumferentially positioning means includes an opening adapted to allow a valve stem projecting outwardly to pass therethrough, said opening and said valve stem cooperating to rotationally align said first and second fastener members.

9. An improved retention means as set forth in claim 1 wherein the wheel trim is a wheel cover.

10. An improved retention means as set forth in claim 1 wherein a plurality of said one of said members are circumferentially spaced on said inwardly facing surface of said wheel trim.

11. A wheel trim retention means as set forth in claim 10 further including a plurality of said other of said members circumferentially spaced on said wheel.

12. A wheel trim retention means as set forth in claim 1 wherein said wheel trim further includes a second generally axially inwardly facing surface disposed radially inwardly of said inwardly facing surface and said wheel includes a second generally axially outwardly facing surface disposed radially inwardly of said outwardly facing surface, each of said second axially inwardly and outwardly facing surfaces further having hook and loop fasteners provided thereon and positioned so as to engage each other when said wheel trim is installed upon said wheel.

13. An improved retention means as set forth in claim 1 wherein said one of said members is secured to said wheel trim by adhesive.

14. An improved retention means as set forth in claim 1 wherein said other of said members is provided with a coating of pressure sensitive adhesive for securing said other of said members to said wheel.

15. A wheel trim comprising:
   a trim member having means defining a generally axially inwardly facing surface portion and a center portion adapted to overlie and conceal fastener receiving openings provided in said vehicle wheel when said wheel trim is assembled thereto;
   a first hook and loop fastener member comprising a base portion having a plurality of outwardly projecting loops per square inch provided thereon; and
   a second hook and loop fastener member comprising a base portion having a plurality of outwardly projecting hooks per square inch provided thereon;
   one of said first and second members being secured to said axially inwardly facing surface portion and another of said first and second members being disposed thereon with said hooks and said loops being in mutually cooperative releasable retaining engagement;
   a radially outwardly extending protrusion provided on said trim member adapted to engage an axially extending portion of a vehicle wheel when said wheel trim is installed thereon so as to assist in positioning said wheel trim with respect to said vehicle wheel;

said another of said first and second members having an adhesive material provided thereon whereby said another of said first and second members may be permanently secured to a vehicle wheel upon initial installation of said wheel trim to said vehicle wheel, said first and second members being thereafter separable so as to enable said wheel trim to be repeatedly removed and reinstalled on said vehicle wheel utilizing the same first and second hook and loop fastener members.

16. An improved retention means as set forth in claim 15 wherein the wheel trim is a hub cap and said protrusion is in the form of an annular generally axially and radially outwardly extending flange portion.

17. A wheel trim as set forth in claim 15 wherein said surface portion is positioned on said wheel trim adjacent the radially outer periphery thereof.

18. A wheel trim comprising:

a trim ring having an ornamental outer surface and means defining a generally axially inwardly facing surface portion;

a first hook and loop fastener member comprising a base member having a plurality of outwardly projecting loops per square inch provided thereon;

a second hook and loop fastener member comprising a base member having a plurality of outwardly projecting hooks per square inch provided thereon;

one of said first and second members being secured to said surface portion of said trim ring;

the other of said first and second members having means adapted to enable said other of said first and second members to be permanently secured to a generally axially outwardly facing surface portion of a vehicle wheel, said axially outwardly facing surface portion being alignable with said axially inwardly facing surface portion of said trim ring whereby said hooks and said loops may be positioned in mutually releasably engaging relationship to secure said trim ring to said wheel, said first and second members being thereafter separable to enable said trim ring to be repeatedly removed from and reinstalled on said vehicle wheel utilizing the same first and second hook and loop fastener members; and positioning means including a generally radially outwardly extending axially elongated protrusion provided on said trim ring, said protrusion being engageable with a generally axially extending surface portion of said wheel so as to accurately position said trim ring with respect to said wheel and means for circumferentially positioning said trim ring relative to said wheel, said protrusions and said circumferential positioning means cooperating to align said first and second members so as to enable and insure mutual engagement of a maximum number of said hooks and loops thereby enabling said trim ring to be easily removed and reinstalled on said wheel utilizing the same hook and loop fastener.

19. A method for removably retaining a wheel trim on a vehicle wheel, said wheel trim having means defining a generally axially inwardly facing surface portion alignable with a generally axially outwardly facing surface portion of said vehicle wheel and a radially outwardly extending protrusion provided on said wheel trim engageable with a generally axially extending portion of said vehicle wheel when said wheel trim is installed thereon to assist in positioning said axially inwardly and outwardly facing surface portions in aligned relationship, a first hook and loop fastener member comprising a base portion having a plurality of outwardly projecting loops per square inch provided thereon, a second hook and loop fastener member comprising a base portion having a plurality of outwardly projecting hooks per square inch provided thereon, said method including securing one of said first and second hook and loop fastener members to said generally axially inwardly facing surface portion of said trim member, securing the other of said first and second hook and loop fastener members to said axially outwardly facing surface portion of said vehicle wheel and thereafter installing said wheel trim on said vehicle wheel with said protrusions engaging said axially extending portion thereof to align said first and second hook and loop fastener members whereby said plurality of hooks may be moved into releasable engaging relationship with respective of said plurality of loops to thereby removably retain said trim member on said vehicle wheel.

* * * * *

UNITED STATES PATENT AND TRADEMARK OFFICE
CERTIFICATE OF CORRECTION

PATENT NO. : 4,344,654

DATED : August 17, 1982

INVENTOR(S) : Frederick A. Apczynski

It is certified that error appears in the above-identified patent and that said Letters Patent are hereby corrected as shown below:

On the title page:
Inventor's name (2 occurrences) at beginning of patent document, should be -- Apczynski --.

Column 1, line 29, after "to" (second occurrence) insert --the--.

Signed and Sealed this

Fourteenth Day of December 1982

[SEAL]

Attest:

GERALD J. MOSSINGHOFF

Attesting Officer

Commissioner of Patents and Trademarks